United States Patent
Tsuji et al.

(10) Patent No.: US 8,334,953 B2
(45) Date of Patent: Dec. 18, 2012

(54) DISPLAY DEVICE INTEGRAL WITH PROTECTION PLATE, AND DISPLAY APPARATUS USING THE SAME

(75) Inventors: Masaki Tsuji, Kunitachi (JP); Masami Morikawa, Fussa (JP); Tatsuhito Harada, Hino (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 12/955,856

(22) Filed: Nov. 29, 2010

(65) Prior Publication Data

US 2011/0070799 A1 Mar. 24, 2011

Related U.S. Application Data

(63) Continuation of application No. 12/236,696, filed on Sep. 24, 2008, now Pat. No. 7,961,281.

(30) Foreign Application Priority Data

Sep. 28, 2007 (JP) .................................. 2007-254442
Sep. 28, 2007 (JP) .................................. 2007-254443

(51) Int. Cl.
*G02F 1/1333* (2006.01)
*G02F 1/1339* (2006.01)
*H01J 9/24* (2006.01)

(52) U.S. Cl. ............. 349/122; 349/58; 349/155; 445/24

(58) Field of Classification Search .................... 349/58, 349/122, 155; 445/24
See application file for complete search history.

(56) References Cited

U.S. PATENT DOCUMENTS

| | | | |
|---|---|---|---|
| 6,833,953 B2 | 12/2004 | Miyazawa et al. | |
| 7,830,595 B2 | 11/2010 | Hinata et al. | |
| 7,961,281 B2 | 6/2011 | Tsuji et al. | |
| 2006/0262260 A1 | 11/2006 | Majumdar et al. | |
| 2007/0070477 A1* | 3/2007 | Eto et al. | 359/12 |
| 2007/0071909 A1* | 3/2007 | Eun et al. | 428/1.1 |
| 2007/0097299 A1 | 5/2007 | Watanabe et al. | |
| 2007/0132911 A1 | 6/2007 | Fujiwara et al. | |
| 2007/0252922 A1 | 11/2007 | Oohira | |

(Continued)

FOREIGN PATENT DOCUMENTS

JP  3-204616 A  9/1991

(Continued)

OTHER PUBLICATIONS

Korean Office Action dated Feb. 15, 2011 (and English translation thereof) in counterpart Korean Application No. 10-2010-0109302.

(Continued)

*Primary Examiner* — Jerry Blevins
(74) *Attorney, Agent, or Firm* — Holtz, Holtz, Goodman & Chick, PC

(57) ABSTRACT

A display device includes a display panel to display an image, a protection plate that is arranged on an observation side of the display panel with a predetermined gap with respect to the display panel, spacer that is arranged between the display panel and the protection plate to surround a region that corresponds to a screen area of the display panel, and a filler layer filling the region that is surrounded by the spacer of a gap between the display panel and the protection plate. The spacer includes at least one missing portion to connect an inside and an outside of the region to each other. The filler layer has been polymerized by irradiation of light and heating.

8 Claims, 9 Drawing Sheets

U.S. PATENT DOCUMENTS

| | | | |
|---|---|---|---|
| 2007/0267134 A1 * | 11/2007 | Konarski et al. | 156/273.3 |
| 2008/0106675 A1 | 5/2008 | Uesaka et al. | |
| 2008/0297685 A1 | 12/2008 | Sugibayashi et al. | |
| 2009/0011197 A1 | 1/2009 | Matsuhira | |
| 2010/0149452 A1 | 6/2010 | Harada et al. | |
| 2010/0231821 A1 | 9/2010 | Tsuji et al. | |
| 2010/0231837 A1 | 9/2010 | Harada et al. | |
| 2010/0245707 A1 | 9/2010 | Harada | |

FOREIGN PATENT DOCUMENTS

| | | | |
|---|---|---|---|
| JP | 6-337411 A | 12/1994 | |
| JP | 8-6503 A | 1/1996 | |
| JP | 2529118 Y2 | 12/1996 | |
| JP | 10-214032 A | 8/1998 | |
| JP | 11-174417 A | 7/1999 | |
| JP | 2000-075306 A | 3/2000 | |
| JP | 2000-221512 A | 8/2000 | |
| JP | 2002-347155 A | 12/2002 | |
| JP | 2003-215344 A | 7/2003 | |
| JP | 2005-55641 A | 3/2005 | |
| JP | 2005055641 A * | 3/2005 | 349/58 |
| JP | 2005-114789 A | 4/2005 | |
| JP | 2005-179481 A | 7/2005 | |
| JP | 2006-163742 A | 6/2006 | |
| JP | 2006-189715 A | 7/2006 | |
| JP | 2006-195209 A | 7/2006 | |
| JP | 2007-114737 A | 5/2007 | |
| JP | 2007-164154 A | 6/2007 | |
| JP | 2008-170753 A | 7/2008 | |
| JP | 2008-209510 A | 9/2008 | |
| JP | 2008-241728 A | 10/2008 | |
| JP | 2008-281997 A | 11/2008 | |
| JP | 2009-8703 A | 1/2009 | |
| JP | 2009-069333 A | 4/2009 | |
| JP | 2009-075217 A | 4/2009 | |
| JP | 2009-86187 A | 4/2009 | |
| JP | 2009-086188 A | 4/2009 | |
| JP | 2009-109855 A | 5/2009 | |
| JP | 2009-175701 A | 8/2009 | |
| KR | 100465678 B1 | 12/2004 | |
| KR | 10-2008-0032116 A | 4/2008 | |
| TW | M264519 U | 5/2005 | |

OTHER PUBLICATIONS

Japanese Office Action dated Sep. 29, 2009 and English translation thereof issued in a counterpart Japanese Application No. 2007-254442.

Chinese Office Action dated Mar. 12, 2010 and English translation thereof in counterpart Chinese Application No. 200810161751.6.

Korean Office Action dated Mar. 26, 2010 and English translation thereof in counterpart Korean Application No. 10-2008-0093655.

U.S. Appl. No. 12/721,611, filed Mar. 11, 2010. Protective Plate Integrated Display Apparatus to Tatsuhito Harada et al.

U.S. Appl. No. 12/721,658, filed Mar. 11, 2010. Protective Plate Integrated Display Apparatus to Masaki Tsuji et al.

Japanese Office Action dated Aug. 18, 2009 (4 pages), and English translation thereof (6 pages), issued in counterpart Japanese Application Serial No. 2007-254443.

Japanese Office Action dated Sep. 14, 2010 and English translation thereof issued in a counterpart Japanese Application No. 2007-254443.

Japanese Office Action dated Mar. 27, 2012 (and English translation thereof) issued in Japanese Application No. 2009-253560, which is a Japanese counterpart of the present application.

U.S. Appl. No. 12/730,393; First Named Inventor: Tatsuhito Harada; Title: "Protection Plate Integrated Display Apparatus"; Filed: Mar. 24, 2010.

U.S. Appl. No. 12/632,974; First Named Inventor: Tatsuhito Harada; Title: "Liquid Crystal Display Apparatus and Manufacturing Method Thereof"; Filed: Dec. 8, 2009.

Taiwanese Office Action dated Jul. 9, 2012 (and English translation thereof) in counterpart Taiwanese Application No. 097137013.

* cited by examiner

DISPLAY DEVICE INTEGRAL WITH PROTECTION PLATE, AND DISPLAY APPARATUS USING THE SAME

CROSS-REFERENCE TO RELATED APPLICATIONS

This application is a Continuation Application of parent application Ser. No. 12/236,696 filed Sep. 24, 2008 now U.S. Pat. No. 7,961,281, which is based upon and claims the benefit of priority from prior Japanese Patent Applications No. 2007-254442, filed Sep. 28, 2007; and No. 2007-254443, filed Sep. 28, 2007, the entire contents of all of which are incorporated herein by reference.

BACKGROUND OF THE INVENTION

1. Field of the Invention

The present invention relates to a display device integral with a protection plate in which the protection plate to protect the observation surface of a display panel to display an image is integrally arranged on the observation side of the display panel, and a display apparatus using this display device.

2. Description of the Related Art

A liquid crystal display device integral with a protection plate is available. In this liquid crystal display device, an observation surface protection plate is arranged on the observation side of a display panel. The protection plate is bonded to the liquid crystal display panel through a frame-like spacer. The region that is surrounded by the spacer of the gap between the liquid crystal display panel and observation surface protection plate is filled with a viscous liquid (see Jpn. UM Registration No. 2529118).

This liquid crystal display device, however, is difficult to manufacture because the viscous liquid to fill the gap between the display panel and observation surface protection plate must be sealed so as not to leak.

BRIEF SUMMARY OF THE INVENTION

A display device according to the first aspect of the present invention includes a display panel to display an image, a protection plate that is arranged on an observation side of the display panel with a predetermined gap with respect to the display panel and configured to protect an observation surface of the display panel, a spacer that is arranged between the display panel and the protection plate to surround a region that corresponds to a screen area of the display panel, and a filler layer filling the region that is surrounded by the spacer of a gap between the display panel and the protection plate. The spacer includes at least one missing portion to connect an inside and an outside of the region to each other. The filler layer has been polymerized by irradiation of light and heating.

A display device according to the second aspect of the present invention includes a display panel to display to display an image, a protection plate that is arranged on an observation side of the display panel with a predetermined gap with respect to the display panel and configured to protect an observation surface of the display panel, a film member that is arranged on a surface of the protection plate that opposes the display panel outside a screen area of the display panel so as to surround a region that corresponds to the screen area and overlap the display panel at least partly, and a filler layer formed of a resin which is filling the region that is surrounded by an inner edge of the film member of a gap between the display panel and the protection plate. The film member includes at least one missing portion formed at a portion overlapping with the display panel. The missing portion extends outside the display panel to connect an inside and an outside of the region to each other.

A display device according to the third aspect of the present invention includes a housing including a display opening, a support provided in the housing to correspond to the opening, a display device, and a surface light source unit that is fixed to the support in the housing on a side of the display device that is opposite to the observation side. The display device includes a display panel to display an image, a protection plate that is arranged on an observation side of the display panel with a predetermined gap with respect to the display panel, has a size to fit in the opening of the housing, and is configured to protect an observation surface of the display panel, a spacer that is arranged between the display panel and the protection plate to surround a region that corresponds to a screen area of the display panel, and includes at least one missing portico to connect an inside and an outside of the region to each other, and an elastic filler layer filling the region that is surrounded by the spacer of a gap between the display panel and the protection plate, and has been polymerized by irradiation of light and heating. The surface light source unit is configured to fix the display device and radiate illumination light toward the display device.

According to the present invention, a display device integral with a protection plate, and a display apparatus that uses the same can be manufactured easily.

Advantages of the invention will be set forth in the description that follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Figure 1:
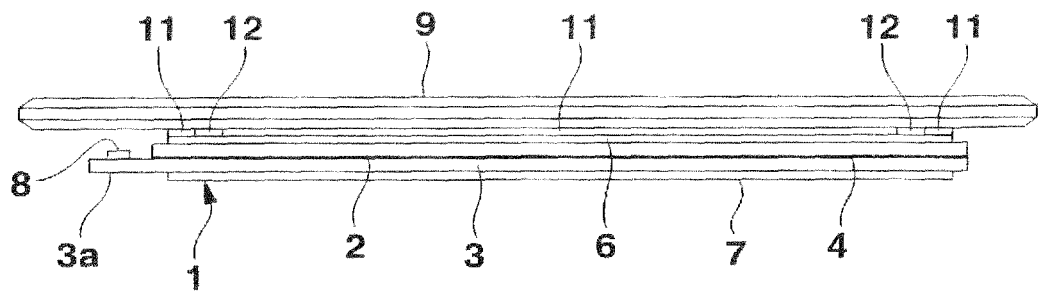
FIG. 1 is a side view of a display device integral with a protection plate according to the first embodiment of the present invention.
Figure 2:
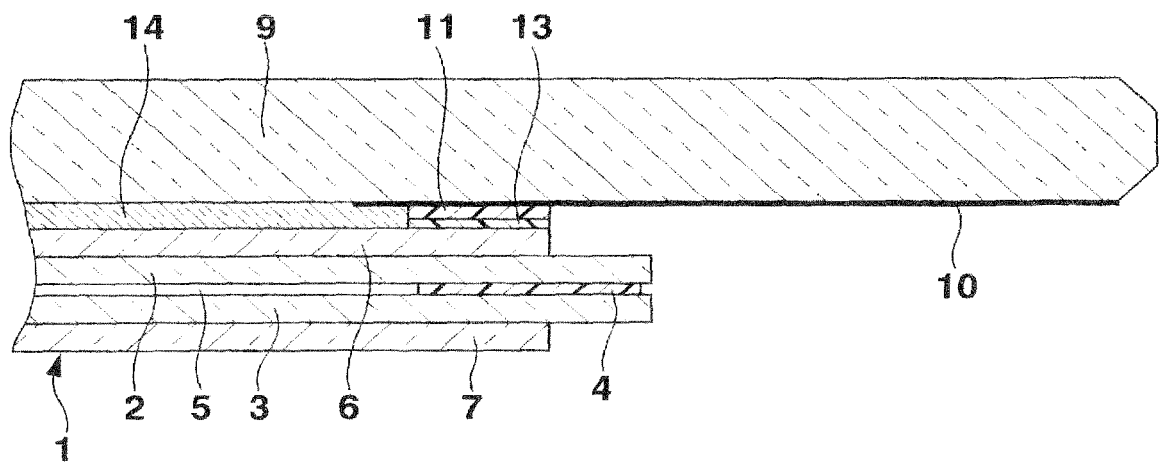
FIG. 2 is an enlarged sectional view of one end of the display device integral with the protection plate of the first embodiment.

FIGS. 1 to 4 show the first embodiment of the present invention, in which FIG. 1 is a side view of a display device integral with a protection plate, and FIG. 2 is an enlarged sectional view of one end of the display device integral with the protection plate.

As shown in FIGS. 1 and 2, this display device integral with the protection plate comprises a display panel 1, a protection plate 9, a spacer 11, and a transparent filler layer 14. The display panel 1 is to display an image. The protection plate 9 is arranged on the observation side of the display panel 1 with a predetermined gap with respect to the display panel 1 and serves to protect the observation surface. The spacer 11 is arranged between the display panel 1 and protection plate 9 to surround the region that corresponds to a screen area 1a of the display panel 1 (see FIG. 3). The spacer 11 is provided with at least one missing portion 12, e.g., a plurality of missing portions 12, to connect the inside and outside of the region to with each other. The filler layer 14 is filling the region that is surrounded by the spacer 11 of the gap between the display panel 1 and protection plate 9. The filler layer 14 has been polymerized by irradiation of light (e.g., ultraviolet irradiation) and heating.

The display panel 1 is, e.g., a liquid crystal display panel, and comprises a pair of observation side and opposite side transparent substrates 2 and 3, a liquid crystal layer 5, and a pair of observation side and opposite side polarizing plates 6 and 7. The transparent substrates 2 and 3 oppose each other at a predetermined gap and are bonded to each other through a frame-like seal member 4 surrounding the screen area 1a. The liquid crystal layer 5 is sealed in the region that is surrounded by the seal member 4 of the gap between the substrates 2 and 3. The polarizing plates 6 and 7 are arranged on the outer surfaces of the pair of substrates 2 and 3, respectively.

The display panel 1 is, e.g., an active matrix crystal display panel including TFTs (thin film transistors) as active elements. The inner surface of one substrate, e.g., the transparent substrate 3 that is opposite to the observation side is provided with transparent pixel electrodes, TFTs, scanning lines, and signal lines, although not shown in the drawings. The transparent pixel electrodes are arranged to form a matrix in the row and column directions. The TFTs are arranged to correspond to the pixel electrodes and connected to the corresponding pixel electrodes. The scanning lines are to supply gate signals to the TFTs on the respective rows. The signal lines are to supply data signals to the TFTs on the respective columns. The inner surface of the other substrate, e.g., the observation side substrate 2, is provided with a film-like transparent opposed electrode that opposes the array region of the pixel electrodes.

The opposite side substrate 3 has a driver mounting portion 3a extending to outside the observation side substrate 2. The scanning lines and signal lines are connected to a display driver 8 mounted on the driver mounting portion 3a. The opposed electrode is connected to an opposed electrode potential supply source through cross connections (not shown) formed on a substrate bonding portion formed of the seal member 4 and opposed electrode connection lines (not shown) formed on the driver mounting portion 3a.

Although not shown, the inner surface of the observation side substrate 2 is provided with color filters of three colors, i.e., red, green, and blue, to respectively correspond to the pixels comprising regions where the pixel electrodes and opposed electrode oppose. The opposed electrode is formed on the color filters. The inner surfaces of the pair of substrates 2 and 3 are provided with alignment films to cover the electrodes. Between the pair of substrates 2 and 3, the liquid crystal molecules of the liquid crystal layer 5 are aligned in an alignment state defined by the alignment films.

The display panel 1 controls transmission of light emitted from a surface light source (not shown) arranged on its side that is opposite to the observation side by applying a voltage across the electrodes of the pixels, to display an image.

The protection plate 9 is formed of a transparent plate such as a glass plate or acrylic resin plate, and forms a rectangular plate with such a size that its outer peripheral portion extends outside the display panel 1 when as viewed from the observation side of the display panel 1.

A light-shielding film 10 is formed on that surface of the protection plate 9 which opposes the display panel 1, on the outer peripheral portion between the outer circumferential edge of the portion corresponding to the spacer 11 and the circumferential edge of the protection plate 9, to correspond to the region that is outside the screen area 1a of the display panel 1. The light-shielding film 10 is formed of a light-shielding paint printed film or a metal film such as a chromium plating or deposition film.

The spacer 11 forms a rectangular frame surrounding the region that corresponds to the screen area 1a of the display panel 1. The missing portions 12, connecting the inside and outside of the region to each other, are respectively formed near the four corners of the rectangular frame.

The spacer 11 is formed of a resin film with a thickness corresponding to the gap provided between the display panel 1 and protection plate 9. A pressure-sensitive adhesive double coated film 13 having the same shape as that of the spacer 11 is adhered to one surface of the spacer 11.

The spacer 11 is adhered to one of the opposing surfaces of the display panel 1 and protection plate 9, e.g., the observation side surface of the display panel 1, i.e., the outer surface of the observation side polarizing plate 6, through the pressure-sensitive adhesive double coated film 13. The spacer 11 abuts against the other one of the opposing surfaces of the display panel 1 and protection plate 9, i.e., that surface (the film surface of the light-shielding film 10) of the protection plate 9 which opposes the display panel 1.

Figure 3:
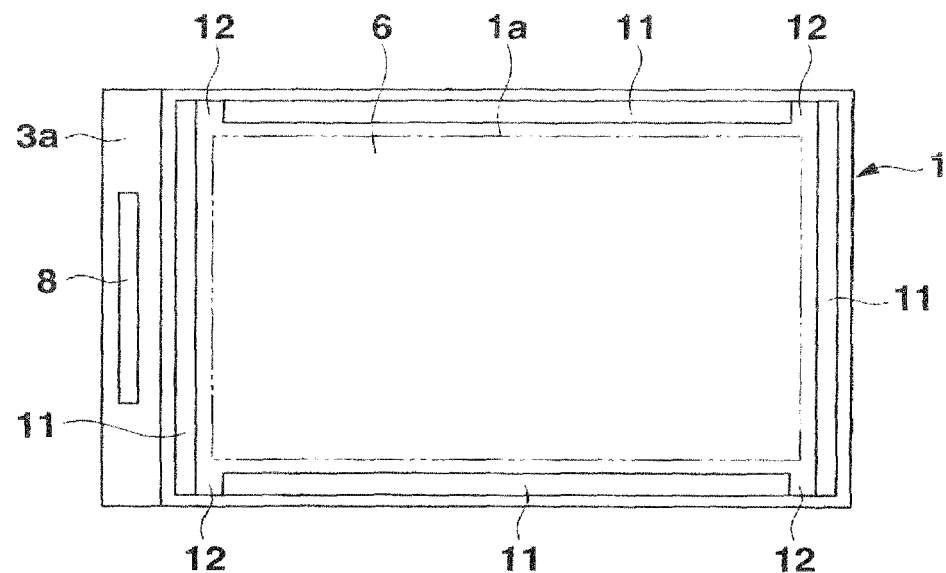
FIG. 3 is a plan view of a spacer-adhered liquid crystal display device of the first embodiment.

FIG. 3 is a plan view of the display panel 1 to which the spacer 11 is adhered. According to this embodiment, the spacer 11 is arranged on the left and right sides, throughout the entire lengths, of the region that corresponds to the screen area 1*a* of the display panel 1, and on those portions of the upper and lower sides of the region excluding the two ends of each side, to surround the region. Thus, the missing portions 12 are formed between the ends of the left and right sides of the spacer 11 and the ends of the upper and lower sides of the spacer 11.

The filler layer 14 filling the region that is surrounded by the spacer 11 of the gap between the display panel 1 and protection plate 9 is formed of a transparent resin having the characteristics of both ultraviolet polymerization properties and thermal 1C polymerization properties.

The transparent resin having the characteristics of both ultraviolet polymerization properties and thermal polymerization properties is obtained by adding a hardening initiator made of an organic peroxide such as sulphonium salt to a cycloaliphatic epoxy resin, e.g., acrylic monomer such as acrylate or methacrylate, or acrylic oligomer as a lower polymer of one or both of acrylate and methacrylate.

Desirably, this resin has characteristics including a viscosity in an unpolymerized state of 1,500 mPa·s (millipascal second) to 10,000 mPa·s and preferably 3,000 mPa·s to 5,000 mPa·s, an E-code hardness after ultraviolet polymerization and thermal polymerization of E4 to E13 and preferably E7 to E10, and a shrinkage factor by ultraviolet polymerization and thermal polymerization of 0.9% to 2.0% and preferably 0.97% to 1.64%.

Figure 4:
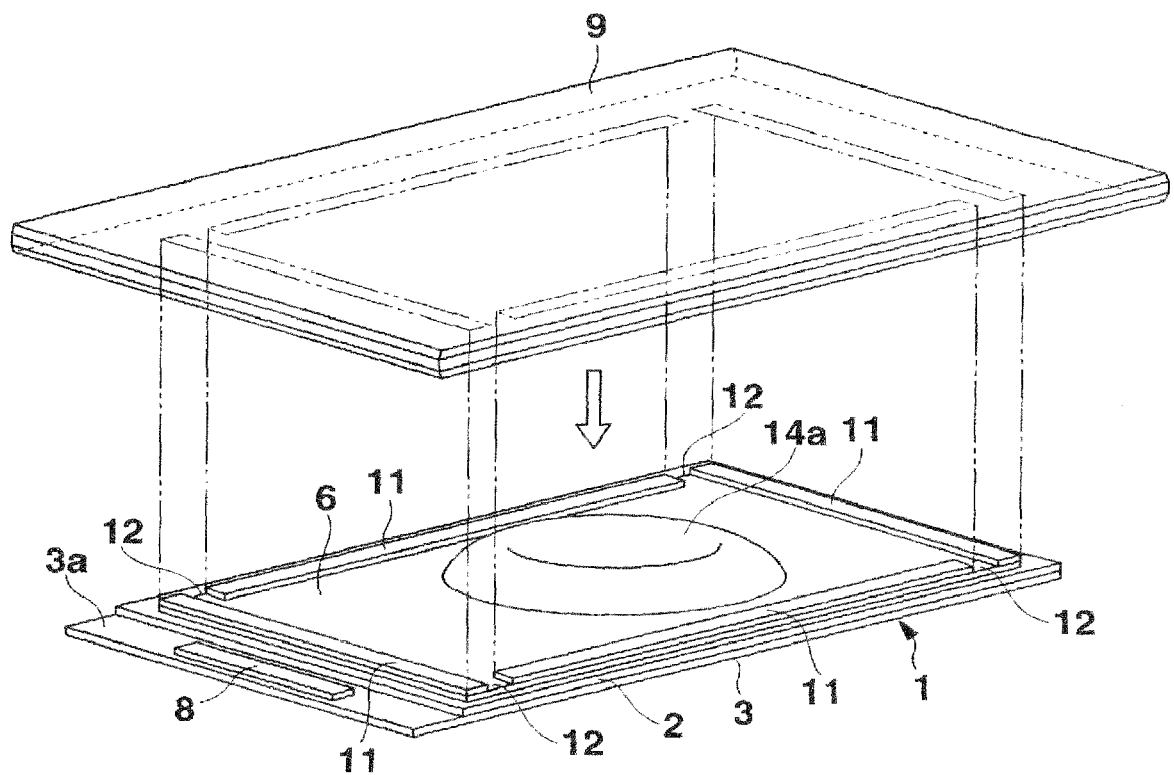
FIG. 4 is a view showing a method of manufacturing the display device integral with the protection plate of the first embodiment.

FIG. 4 shows a method of manufacturing the display device integral with the protection plate. This display device integral with the protection plate is obtained in the following manner. The spacer 11 is adhered to the observation side surface (the outer surface of the polarizing plate 6) of the display panel 1 through the pressure-sensitive adhesive double coated film 13. After that, a filler 14*a* comprising a transparent resin with the characteristics of both ultraviolet polymerization properties and thermal polymerization properties is supplied by a dispenser or the like to near the center of that surface of the display panel 1 (near the center of the screen area 1*a*) where the spacer 11 is adhered. The protection plate 9 is overlaid on the filler 14*a*, and pressure is applied to the protection plate 9. Thus, that surface of the protection plate 9 which opposes the display panel 1 abuts against the spacer 11. The pressure applied to the protection plate 9 spreads the filler 14*a* over the entire region surrounded by the spacer 11. Ultraviolet rays are radiated to the outer side of the protection plate 9 while maintaining the pressure. Then, after the pressure is removed or while the pressure is maintained, the resultant structure is left still in a heating atmosphere maintained at the polymerization temperature of the filler 14*a* for a predetermined period of time, thus polymerizing the filler 14*a*.

In the manufacture of this display device integral with the protection plate, when the protection plate 9 is overlaid on the filler 14*a* supplied onto the display panel 1 and is pressurized, the filler 14*a* is spread while discharging air between the display panel 1 and protection plate 9 to the outside through the missing portions 12 formed in the spacer 11, to fill the entire region surrounded by the spacer 11.

According to this embodiment, the spacer 11 is formed into the rectangular frame surrounding the region that corresponds to the screen area 1*a* of the display panel 1 and including the missing portions 12 near the four corners of the rectangular frame. Accordingly, air between the display panel 1 and protection plate 9 is discharged from the missing portions 12 near the four corners, so that the filler 14*a* is spread toward the whole circumference of the region surrounded by the spacer 11, thus filling the entire region evenly.

The supply amount of filler 14*a* onto the display panel 1 is set so that the amount of filler 14*a* squeezed to the outside from the missing portions 12 becomes minimum, in accordance with the capacity of the region, that is, the gap between the display panel 1 and protection plate 9 that is defined by the spacer 11 and the area of the region surrounded by the spacer 11.

The filler 14*a* filling the entire region surrounded by the spacer 11 is polymerized by ultraviolet polymerization when ultraviolet rays irradiate the outer surface of the protection plate 9 while maintaining the pressurized state. Thus, in the region surrounded by the spacer 11, the display panel 1 and protection plate 9 are bonded to each other through the layer of the filler 14*a* that has been polymerized by ultraviolet polymerization.

Ultraviolet radiation is performed in accordance with the characteristics of the filler 14*a* for a period of time slightly longer than the time required for the filler 14*a* to polymerize by ultraviolet polymerization. After that, that is, after the ultraviolet polymerization of the filler 14*a* bonds the display panel 1 and protection plate 9 to each other, the pressure is removed.

In the ultraviolet polymerization of the filler 14*a*, the light-shielding film 10 formed on the outer peripheral portion of that surface of the protection plate 9 which opposes the display panel 1 shields the ultraviolet rays radiated from the outer surface of the protection plate 9. If the protection plate 9 is printed for the purpose of ornament or the like, the printed film also shields the ultraviolet rays. Thus, an insufficient polymerization portion or unpolymerization portion remains on that portion of the ultraviolet-polymerized filler 14*a* which corresponds to the light-shielding film 10 and the printed film.

When the resultant structure is heated to the polymerization temperature of the filler 14*a* after ultraviolet radiation, the insufficient polymerization portion or unpolymerization portion remaining after ultraviolet radiation is thermally polymerized to form the filler layer 14 in which the entire layer of the filler 14*a* has been polymerized.

The ultraviolet polymerization of the filler 14*a* has bonded the display panel 1 and protection plate 9 to each other in advance. Thus, by leaving still the resultant structure in a heating atmosphere maintained at the polymerization temperature of the filler 14*a* for the time equal to or longer than the time period required for the filler 14*a* to thermally polarize, the filler 14*a* can be thermally polymerized without maintaining the pressurized state.

The display device integral with the protection plate comprises the display panel 1, protection plate 9, spacer 11, and transparent filler layer 14. The display panel 1 is to display the image. The protection plate 9 is arranged on the observation side of the display panel 1 at the predetermined gap with respect to the display panel 1. The spacer 11 is arranged between the display panel 1 and protection plate 9 to surround the region that corresponds to the screen area 1*a* of the display panel 1. The spacer 11 includes the missing portions 12 to connect the inside and outside of the region to each other. The filler layer 14 is filling the region that is surrounded by the spacer 11 of the gap between the display panel 1 and protection plate 9. The filler layer 14 has been polymerized by ultraviolet radiation and heating. Hence, the display device integral with the protection plate can be manufactured easily with a higher bonding strength of the display panel 1 and protection plate 9.

More specifically, in the display device integral with the protection plate, the spacer 11 is arranged between the display panel 1 and protection plate 9 to surround the region that corresponds to the screen area 1a of the display panel 1. The filler layer 14, which has filled the region that is surrounded by the spacer 11 of the gap between the display panel 1 and protection plate 9 and has been polymerized by ultraviolet radiation and heating, is arranged in this region. The filler layer 14 accordingly bonds the display panel 1 to the protection plate 9 to each other. Thus, the bonding strength of the display pane 1 and protection plate 9 can be improved.

In the display device integral with the protection plate, the spacer 11 has the missing portions 12 connecting the inside and outside of the region to each other. Accordingly, the filler 14a to form the filler layer 14 is supplied onto the surface of either one of the opposing surfaces of the display panel 1 and protection plate 9 (in this embodiment, that surface of the display panel 1 which opposes the protection plate 9), and the display panel 1 and protection plate 9 are opposed to each other and pressurized, so that the spacer 11 defines the gap between the display panel 1 and protection plate 9. The pressure also spreads the filler 14a toward the portion around the region surrounded by the spacer 11 while discharging air between the display panel 1 and protection plate 9 from the missing portions 12. Then, the filler 14a can fill the entire region without forming any unfilled space.

The filler 14a filling the region is polymerized by ultraviolet radiation while maintaining the pressurized state. After that, the pressure is removed, and the resultant structure is left for a predetermined period of time in the heating atmosphere held at the polymerization temperature of the filter 14a. This thermally polymerizes the insufficient polymerization portion or unpolymerization portion that remains after ultraviolet radiation, thereby forming the filler layer 14.

In contrast to this, when the filler layer 14 is formed of a filler having only ultraviolet polymerization properties, although the filler can be polymerized by ultraviolet radiation for the time almost equal to that in the above embodiment, an insufficient polymerization portion or unpolymerization portion that is not irradiated with the ultraviolet rays is left as it is. Accordingly, it is difficult to polymerize the entire filler completely.

When the filler layer 14 is formed of filler having only thermal polymerization properties, the heating time required to polymerize the filler is longer than the time required for ultraviolet polymerization. Hence, during the heating time, the display panel 1 and protection plate 9 must be maintained pressurized.

In the display device integral with the protection plate of the above embodiment, the display panel 1 and protection plate 9 are bonded by the filler layer 14 that has filled the region that is surrounded by the spacer 11 of the gap between the display panel 1 and protection plate 9 and has been polymerized by ultraviolet radiation and heating. Accordingly, no insufficient polymerization portion or unpolymerization portion remains in the filler layer 14. As a result, a sufficient bonding strength can be maintained between the display panel 1 and protection plate 9.

In the display device integral with the protection plate, the filler 14a fills the region that is surrounded by the spacer 11 of the gap between the display panel 1 and protection plate 9. The tiller 14a is polymerized by ultraviolet polymerization while maintaining the pressurized state of the display panel 1 and protection plate 9. After that, the pressure is removed and the resultant structure is left still in the heating atmosphere. This thermally polymerizes the insufficient polymerization portion or unpolymerization portion of the filler 14a that remains after ultraviolet radiation, thus forming the filler layer 14. Accordingly, the filler layer 14 can be manufactured easily.

In the display device integral with the protection plate, the filler layer 14 that is formed by ultraviolet polymerization and thermal polymerization of the filler 14a has appropriate elasticity like that of a rubber film. When an impact is applied to the outer surface of the protection plate 9, the filler layer 14 can buffer the impact, thereby protecting the display panel 1 from the impact.

Second Embodiment

Figure 5:
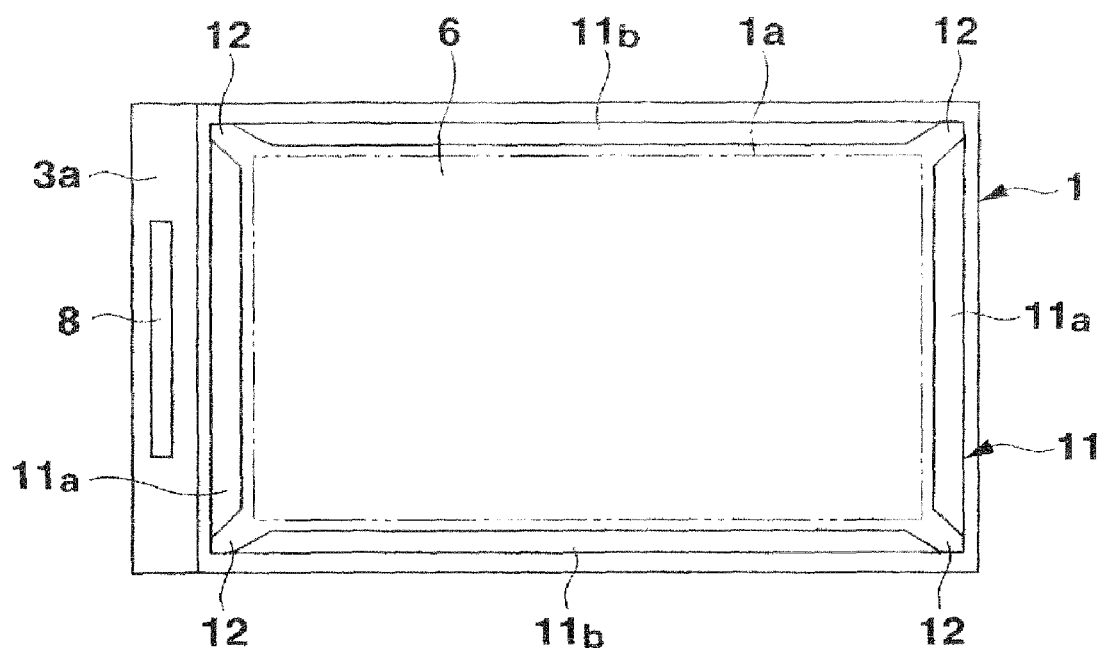
FIG. 5 is a plan view of a spacer-adhered display device according to the second embodiment of the present invention.

FIG. 5 is a plan view of a spacer-adhered display device according to the second embodiment of the present invention.

According to this embodiment, a spacer 11 is arranged on those portions of the left and right sides of the region that corresponds to a screen area 1a of a display panel 1 excluding the upper and lower ends of each side, and on those portions of the upper and lower sides of the region excluding the left and right ends of each side, to surround the region. More specifically, the spacer 11 forms missing portions 12 between the upper and lower ends of spacers 11a on the left and right sides and the left and right ends of spacers 11b on the upper and lower sides. Each of the missing portions 12 is formed in such a shape that its width increases from the outer edge toward the inner edge of the spacer 11. Except for this, the arrangement of the display device integral with the protection plate of this embodiment is the same as that of the first embodiment described above, and accordingly a repetitive description will be omitted.

According to this embodiment, the missing portions 12, each of which has such a shape that the width increases from the outer edge toward the inner edge of the spacer 11, are formed near the respective corners where the spacers 11a and 11b on the four sides of the spacer 11 intersect. Accordingly, when the display panel 1 and a protection plate 9 are opposed to each other and pressurized, a filler 14a (see FIG. 4) supplied onto the surface of either one of the opposing surfaces of the display panel 1 and protection plate 9 can be spread toward the portion around the region surrounded by the spacer 11 more efficiently, thereby filling the entire region evenly.

Third Embodiment

Figure 6:
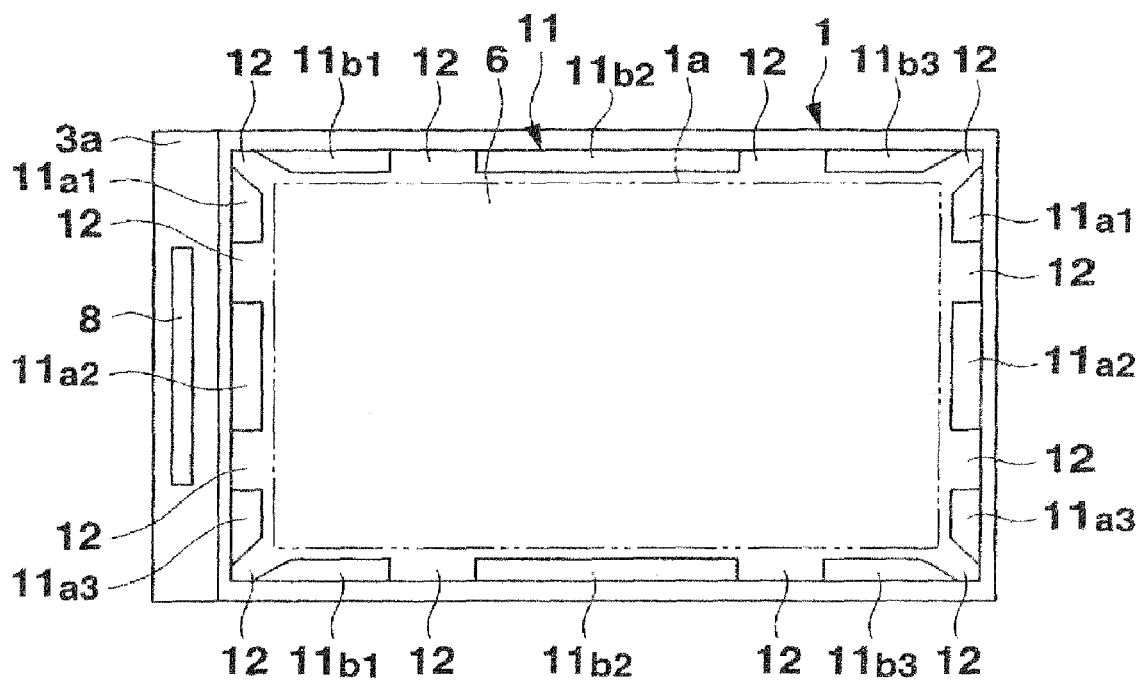
FIG. 6 is a plan view of a spacer-adhered display device according to the third embodiment of the present invention.

FIG. 6 is a plan view of a spacer-adhered display device according to the third embodiment of the present invention.

According to this embodiment, a spacer 11 forms a rectangular frame surrounding the region that corresponds to a screen area 1a of a display panel 1. Missing portions 12 are formed at least at one portion (two portions in FIG. 6) of each of the four sides and the four corners of the rectangular frame. More specifically, spacer portions 11a1, 11a2, 11a3, 11b1, 11b2, and 11b3 that form the spacer 11 are arranged at distances from each other to form the rectangular frame. Except for this, the arrangement of the display device integral with the protection plate of this embodiment is the same as that of the first embodiment described above, and accordingly a repetitive description will be omitted.

According to this embodiment, the missing portions 12 are respectively formed on the four sides and four corners of the spacer 11. Accordingly, when the display panel 1 and a protection plate 9 are opposed to each other and pressurized, a filler 14a (see FIG. 4) supplied onto the surface of either one of the opposing surfaces of the display panel 1 and protection plate 9 can be spread toward the entire peripheral portion of the region surrounded by the spacer 11 more efficiently, thereby filling the entire region evenly.

Fourth Embodiment

Figure 7:
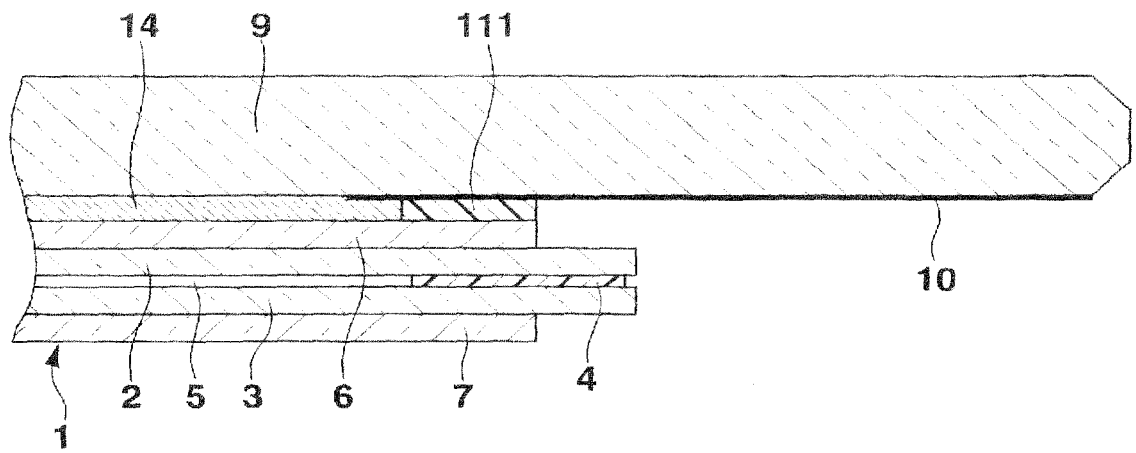
FIG. 7 is an enlarged sectional view of one end of a display device integral with a protection plate according to, the fourth embodiment of the present invention.

FIG. 7 is an enlarged sectional view of one end of a display device integral with a protection plate according to the fourth embodiment of the present invention.

In the display device integral with the protection plate of this embodiment, a spacer 111 formed of a pressure-sensitive adhesive double coated film is provided between a display panel 1 and a protection plate 9 to form a rectangular frame surrounding the region that corresponds to a screen area 1a of the display panel 1. The spacer 111 has missing portions 12 shown in either one of FIGS. 3, 5, and 6. The spacer 111 is adhered to each of both the opposing surfaces of the display panel 1 and protection plate 9. Except for this, the arrangement of the display device integral with the protection plate of this embodiment is the same as that of the first embodiment described above, and accordingly a repetitive description will be omitted.

The display device integral with the protection plate of this embodiment comprises the spacer 111 formed of the pressure-sensitive adhesive double coated film. A filler 14a is supplied onto the surface of either one of the opposing surfaces of the display panel 1 and protection plate 9, in the same manner as in FIG. 4. After that, the display panel 1 and protection plate 9 are opposed and pressurized against each other. Thus, the spacer 111 can be adhered to each of the two opposing surfaces of the display panel 1 and protection plate 9, thereby maintaining the gap between the display panel 1 and protection plate 9.

According to this embodiment, after the spacer 111 is adhered to each of the two opposing surfaces of the display panel 1 and protection plate 9, the pressure is removed, and the filler 14a can be polarized by both ultraviolet polymerization and thermal polymerization without pressure. Accordingly, the display device integral with the protection plate can be manufactured further easily.

Fifth Embodiment

Figure 8:
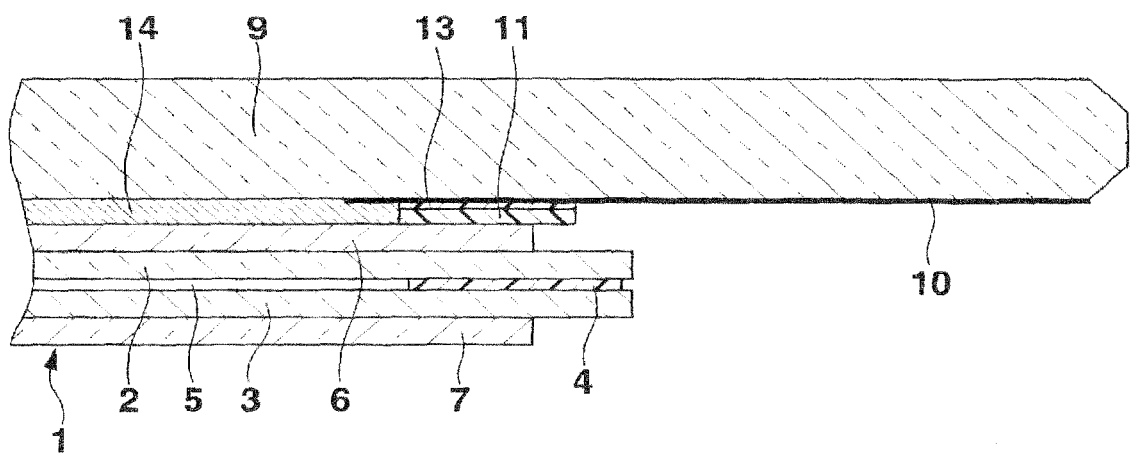
FIG. 8 is an enlarged sectional view of one end of a display device integral with a protection plate according to the fifth embodiment of the present invention.
Figure 9:
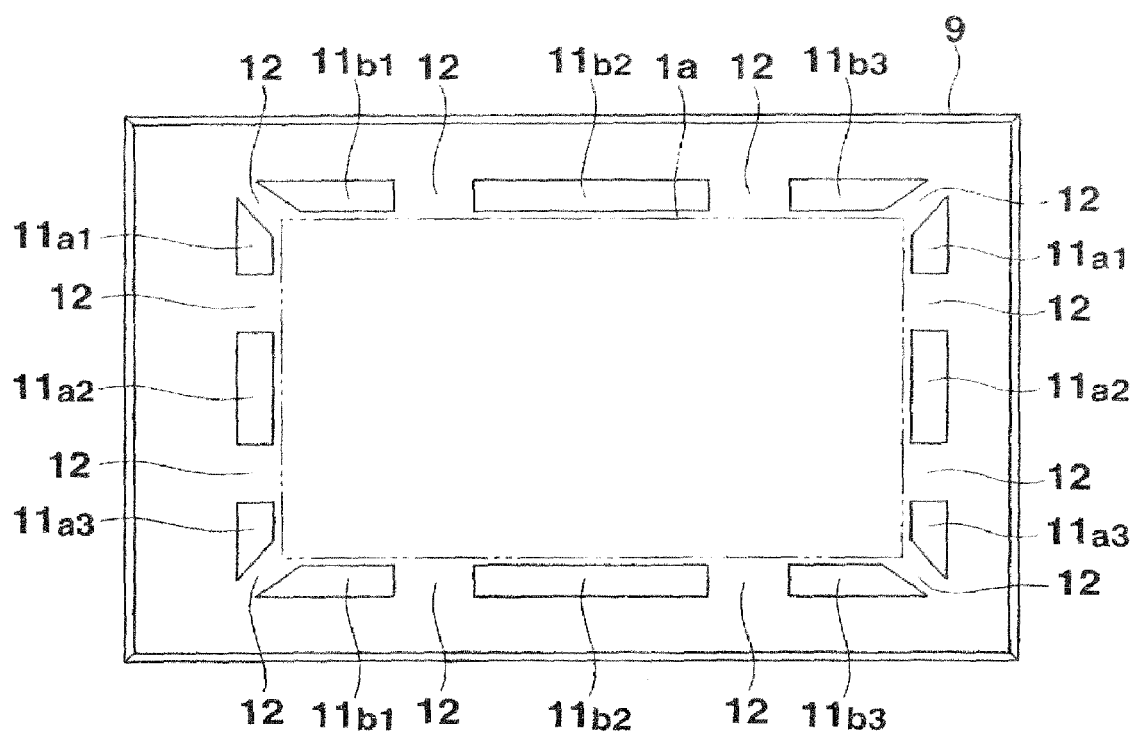
FIG. 9 is a plan view of a spacer-adhered observation surface protection plate of the fifth embodiment that is as viewed from the spacer-adhered surface side.

FIGS. 8 and 9 show the fifth embodiment of the present invention, in which FIG. 8 is an enlarged sectional view of one end of a display device integral with a protection plate, and FIG. 9 is a plan view of a spacer of a spacer-adhered protection plate as viewed from the spacer-adhered surface side.

The display device integral with the protection plate of this embodiment comprises a spacer 11 that is formed of a resin film, forms a rectangular frame surrounding the region that corresponds to a screen area 1a of a display panel 1, and includes at least one missing portion 12, e.g., missing portions 12 formed on the four sides and four corners of the rectangular frame. More specifically, spacer portions 11a1, 11a2, 11a3, 11b1, 11b2, and 11b3 that form the spacer 11 are arranged at distances from each other to form the rectangular frame. The spacer portions 11a1, 11a2, 11a3, 11b1, 11b2, and 11b3 are adhered to that surface of the protection plate 9 (the film surface of a light-shielding film 10) which opposes the display panel 1 through pressure-sensitive adhesive double coated films 13. The opposite surface of the spacer 11 is abutted against that surface of the liquid crystal display panel 1 which opposes the protection plate 9. Except for this, the arrangement of the display device integral with the protection plate of this embodiment is the same as that of the first embodiment described above, and accordingly a repetitive description will be omitted.

Sixth Embodiment

Figure 10:
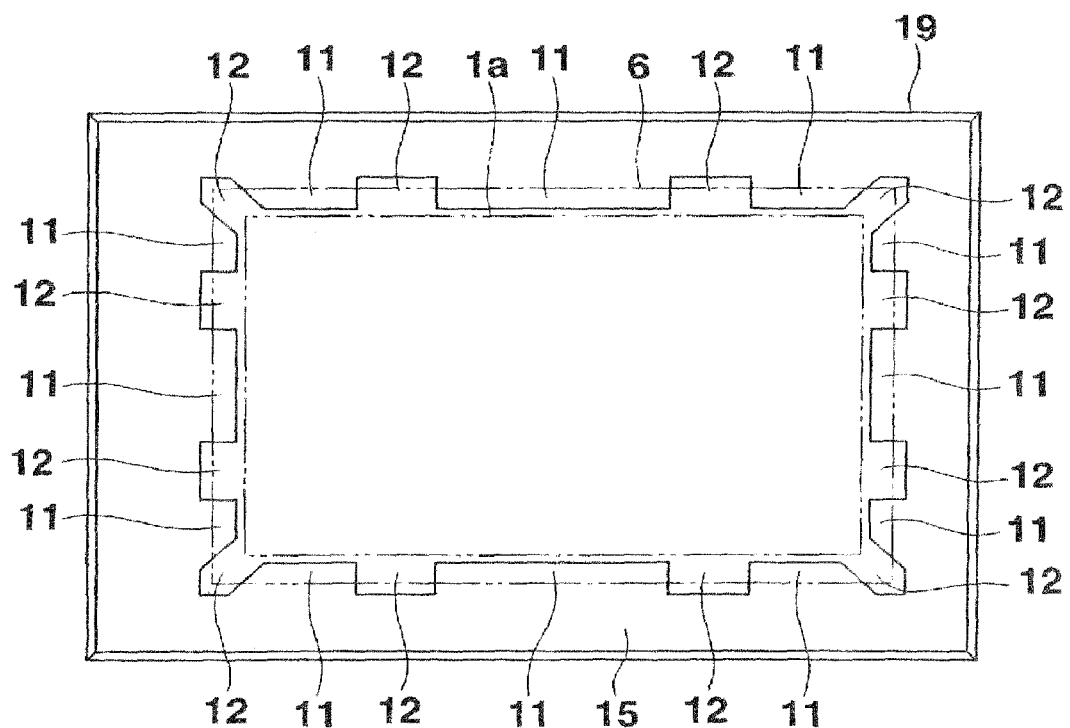
FIG. 10 is a plan view of a spacer-adhered observation surface protection plate according to the sixth embodiment of the present invention that is as viewed from the spacer-adhered surface side.
Figure 11:
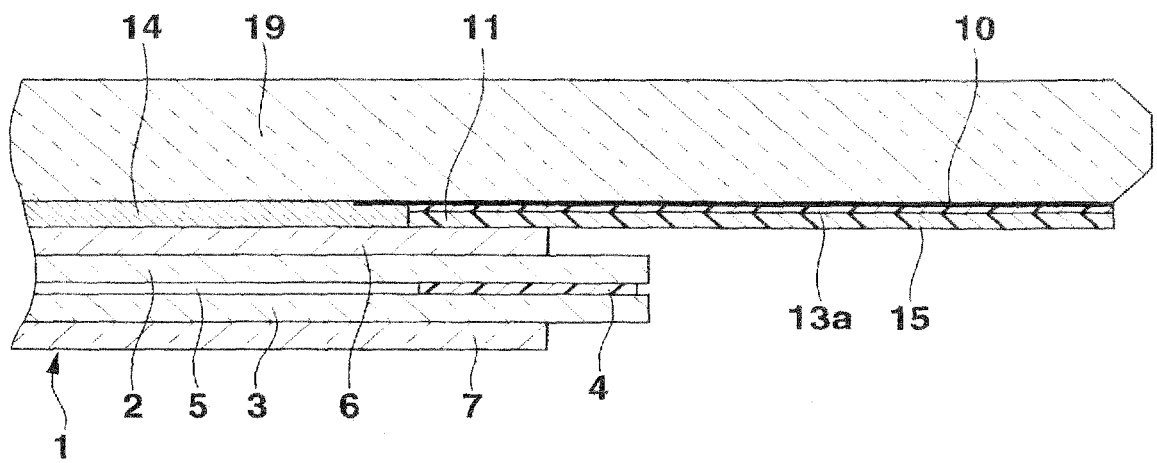
FIG. 11 is an enlarged sectional view of that portion of one end of a display device integral with a protection plate of the sixth embodiment which corresponds to a spacer.
Figure 12:
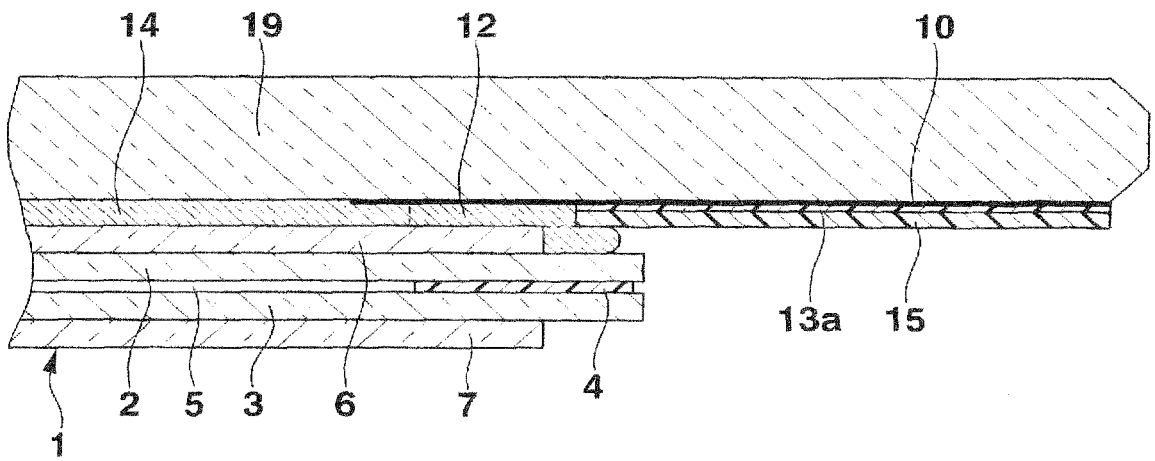
FIG. 12 is an enlarged sectional view of that portion of one end of the display device integral with the protection plate of the sixth embodiment which corresponds to a missing portion of the spacer.

FIGS. 10 to 12 show the sixth embodiment of the present invention, in which FIG. 10 is a plan view of a spacer-adhered protection plate as viewed from the spacer-adhered surface side, FIG. 11 is an enlarged sectional view of that portion of one end of a display device integral with a protection plate which corresponds to a spacer, and FIG. 12 is an enlarged sectional view of that portion of one end of the display device integral with the protection plate which corresponds to a missing portion of the spacer.

The display device integral with the protection plate of this embodiment comprises a protection plate 19 made of tempered glass. The display device includes a splinterproof sheet 15 against fraction of the protection plate 19. The splinterproof sheet 15 is adhered to that surface of the protection plate 19 which opposes a display panel 1. The splinterproof sheet 15 covers the entire outer peripheral portion between the outer circumferential edge of a portion corresponding to a spacer 11 and the circumferential edge of the protection plate 19.

In this embodiment, the spacer 11 is formed of a resin film that forms a rectangular frame surrounding the region that corresponds to a screen area 1a of a display panel 1, and includes at least one missing portions 12, e.g., missing portions 12 formed on the four sides and four corners of the rectangular frame. The splinterproof sheet 15 is formed integrally with the spacer 11.

More specifically, the resin film that is obtained by integrating the spacer 11 and splinterproof sheet 15 is formed of a film member that is arranged on that surface of the protection plate which opposes the display panel 1 outside the screen area 1a of the display panel 1 so as to surround a region that corresponds to the screen area 1a and overlap the display panel 1 at least partly. This film member includes the missing portions 12 formed at a portion overlapping with the display panel 1. Each of the missing portions 12 extends outside the display panel 1 to connect the inside and outside of the region to each other.

Of the edge of the splinterproof sheet 15 that is on the side of the spacer 11, those portions that correspond to the missing portions 12 of the spacer are located outside the outer circumferential edge of that region of the display panel 1 which corresponds to a filler layer 14.

According to this embodiment, the spacer 11 and splinterproof sheet 15 are adhered to that surface (the film surface of a light-shielding film 10) of the protection plate 19 which opposes the display panel 1 through a pressure-sensitive adhesive double coated film 13a having the same shape as that of the spacer 11 and splinterproof sheet 15. The opposite surface of the integral body of the spacer 11 and splinterproof sheet 15 is abutted against that surface of the display panel 1 which opposes the protection plate 19. Except for this, the arrangement of the display device integral with the protection plate of this embodiment is the same as that of the first embodiment described above, and accordingly a repetitive description will be omitted.

In the display device integral with the protection plate of this embodiment, the splinterproof sheet 15 is adhered to the outer peripheral portion of that surface of the tempered glass protection plate 19 which opposes a display panel 1, covering the entire region between the outer circumferential edge of a portion corresponding to the spacer 11 and the circumferential edge of the protection plate 19. Accordingly, even if the protection plate 19 is broken by an excessive impact, the fragments can be prevented from scattering outside.

According to this embodiment, since the splinterproof sheet 15 and spacer 11 are formed integrally, they can be adhered to the protection plate 19 at once, thus facilitating the manufacture of the display device integral with the protection plate.

Furthermore, in this display device integral with the protection plate, of the edge of the splinterproof sheet 15 that is on the side of the spacer 11, those portions that correspond to the missing portions 12 the spacer 11 are located outside the outer circumferential edge of that region of the display panel 1 which corresponds to the filler layer 14. Accordingly, when the display panel 1 and protection plate 9 are opposed to each other and pressurized, air between the display panel 1 and protection plate 19 is discharged outside through the missing portions 12 of the spacer 11 and spaces between the missing portions 12 and the edges of the splinterproof sheet 15 that correspond to the missing portions 12. Thus, a filler 14a that is supplied onto the surface of either one of the opposing surfaces of the display panel 1 and protection plate 9 in the same manner as in FIG. 4 can fill the entire region surrounded by the spacer 11.

Seventh Embodiment

Figure 13:
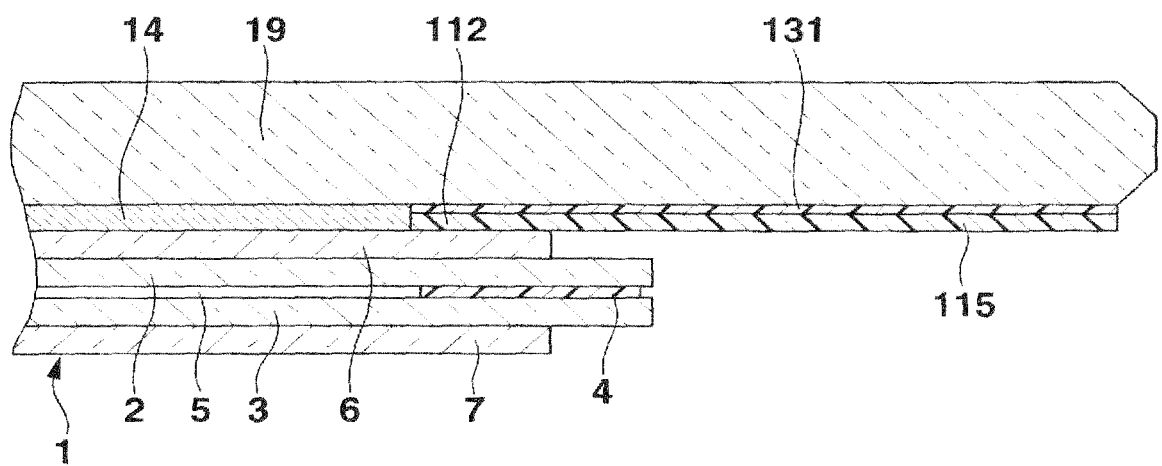
FIG. 13 is an enlarged sectional view of one end of a display device integral with a protection plate according to the seventh embodiment of the present invention.

FIG. 13 is an enlarged sectional view of one end of a display device integral with a protection plate according to the seventh embodiment of the present invention.

In the display device integral with the protection plate of this embodiment, a spacer 112 and a splinterproof sheet 115 formed of a pigment-added light-shielding resin film are adhered to that surface of a tempered glass protection plate 19 which opposes a display panel 1 through a highly transparent pressure-sensitive adhesive double coated film 131 having the same shape as that of the spacer 112 and splinterproof sheet 115. The splinterproof sheet 115 thus forms a light-shielding film corresponding to that region of the liquid crystal display panel 1 which is outside screen area 1a. Except, for this, the arrangement of the seventh embodiment is the same as that of the sixth embodiment.

In this display device integral with the protection plate, the light-shielding splinterproof sheet 115 is adhered to that surface of the protection plate 19 which opposes the liquid crystal display panel 1. The splinterproof sheet 115 forms the light-shielding film corresponding to that region of the liquid crystal display panel 1 which is outside the screen area 1a. Accordingly, the light-shielding film 10 in the above first to sixth embodiments that comprises a printed film formed on the outer peripheral portion of that surface of the protection plate 9 or 19 that opposes the display panel 1 can be omitted. This further facilitates the manufacture of the display device integral with the protection plate.

Eighth Embodiment

Figure 14:
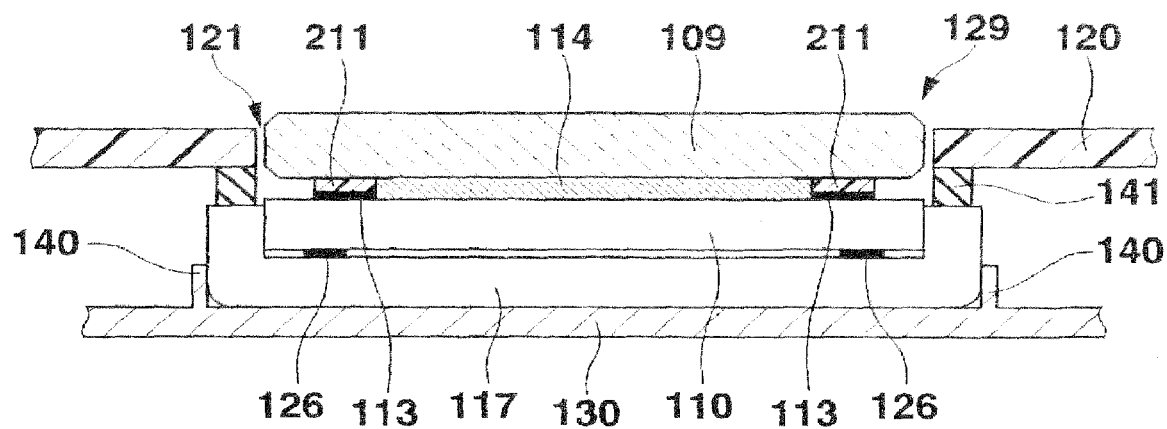
FIG. 14 is a schematic sectional view of a liquid crystal display apparatus according to the eighth embodiment of the present invention.
Figure 15:
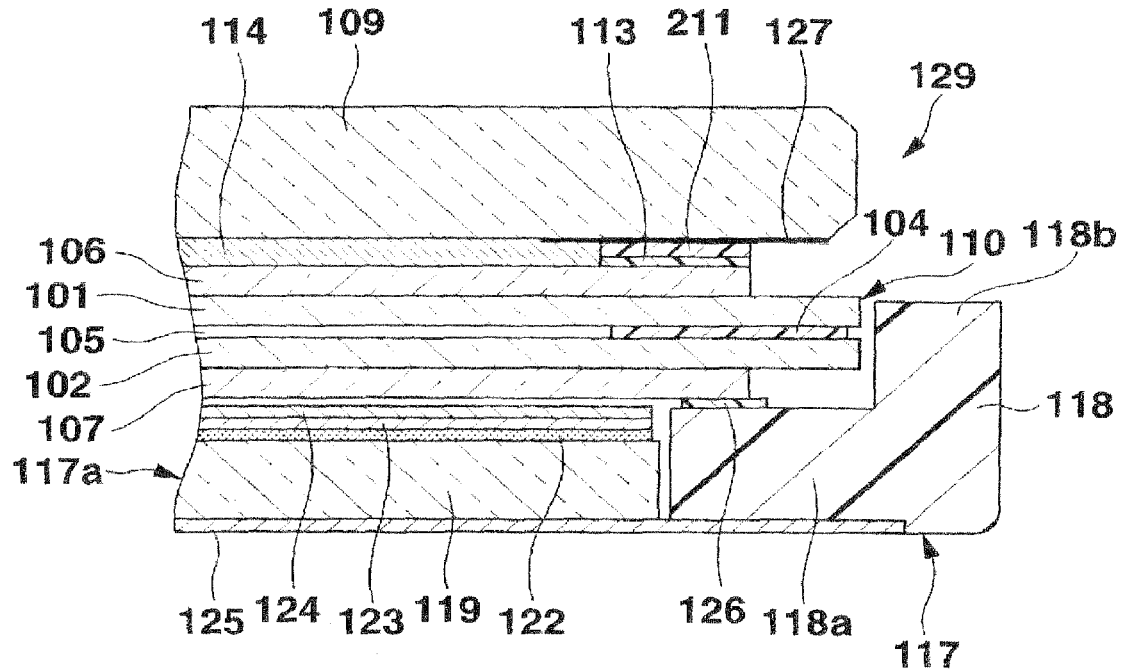
FIG. 15 is an enlarged sectional view of one end of a liquid crystal display module of the eighth embodiment.

FIGS. 14 and 15 show the eighth embodiment of the present invention, in which FIG. 14 is a schematic sectional view of a liquid crystal display apparatus.

This liquid crystal display apparatus is an electronic device such as a portable telephone, digital camera, or electronic organizer, and comprises a housing 120 having a display opening 121 with a predetermined size and a liquid crystal display module 129 arranged in the housing 120 to correspond to the opening 121, as shown in FIG. 14.

As shown in FIG. 14, the liquid crystal display module 129 comprises a liquid crystal display panel 110, a surface light source unit 117, and a protection plate. The surface light source unit 177 is arranged on a side opposite to the observation side (upper side in FIG. 14) of the liquid crystal display panel 110, and is to emit illumination light toward the liquid crystal display panel 110. The protection plate 109 is arranged on the observation side of the liquid crystal display panel 110 at a predetermined gap with respect to the liquid crystal display panel 110. The liquid crystal display panel 110 is fixed to the surface light source unit 117. A spacer 211 is arranged between the liquid crystal display panel 110 and protection plate 109 to surround the region that corresponds to a screen area 1a of the liquid crystal display panel 110. An elastic filler layer 114 is filling the region that is surrounded by the spacer 211 of the gap between the liquid crystal display panel 110 and protection plate 109.

FIG. 15 is an enlarged sectional view of one end of the liquid crystal display module 129. The liquid crystal display panel 110 comprises a pair of observation side transparent substrate 101 and opposite side transparent substrate 102, a liquid crystal layer 105, and a pair of observation side polarizing plate 106 and opposite side polarizing plate 107. The transparent substrates 101 and 102 are arranged to oppose each other at a predetermined gap and bonded to each other through a frame-like seal member 104 that surrounds the screen area. The liquid crystal layer 105 is sealed in that region of the gap between the substrates 101 and 102 which is surrounded by the seal member 104, i.e., sealed in the screen area. The polarizing plates 106 and 107 are respectively arranged on the outer surfaces of the pair of substrates 101 and 102.

The liquid crystal display panel 110 is, e.g., an active matrix liquid crystal display panel including TFTs (thin film transistors) as active elements. The inner surface of one substrate, e.g., the substrate 102 that is opposite to the observation side, is provided with transparent pixel electrodes, TFTs, scanning lines, and signal lines, although not shown in the drawings. The transparent pixel electrodes are arranged to form a matrix in the row and column directions. The TFTs are arranged to correspond to the pixel electrodes and connected to the corresponding pixel electrodes. The scanning lines are to supply gate signals to the TFTs on the respective rows. The signal lines are to supply data signals to the TFTs on the respective columns. The inner surface of the other substrate, e.g., the observation side substrate 101, is provided with a film-like transparent opposed electrode that opposes the array region of the pixel electrodes.

Although not shown, the inner surface of the observation side substrate 101 provided with color filters of three colors, i.e., red, green, and blue, to respectively correspond to the pixels comprising regions where the pixel electrodes and opposed electrode oppose. The opposed electrode is formed on the color filters. The inner surfaces of the pair of substrates 101 and 102 are provided with alignment films to cover the electrodes. Between the pair of substrates 101 and 102, the liquid crystal molecules of the liquid crystal layer 105 are aligned in an alignment state defined by the alignment films.

As shown in FIG. 15, the surface light source unit 117 arranged on that side of the liquid crystal display panel 110 which is opposite to the observation side comprises a surface light source 117a to emit illumination light toward the liquid crystal display panel 110, and a frame member 118 supporting the surface light source 117a.

The surface light source 117a comprises a light-guide plate 119, light-emitting elements (e.g., light-emitting diodes) (not shown), a diffusion layer 122, and a pair of prism sheets 123 and 124. The light-guide plate 119 is formed of a plate-like transparent member. An incident end face where light enters is formed on one end face (not shown) of the light-guide plate 119. An exit surface to irradiate light that has entered the incident end face is formed on one of the two plate surfaces of the light-guide plate 119. A reflection surface to internally reflect light that has entered the incident end face toward the exit surface is formed on the other plate surface. The light-emitting elements are arranged to oppose the incident end face of the light-guide plate 119. The diffusion layer 122 is formed on the exit surface of the light-guide plate 119 and diffuses light irradiated by the light-guide plate 119. The pair of prism sheets 123 and 124 are arranged on the diffusion layer 122 to overlap with each other.

FIG. 15 shows the prism sheets 123 and 124 to form one film. Thin elongated prisms parallel to the widthwise direction (a direction parallel to the incident end face) of the light-guide plate 119 are formed at small pitches on one of the prism sheets 123 and 124, e.g., the prism sheet 123 on the side of the diffusion layer 122. Thin elongated prisms parallel to the longitudinal direction of the light-guide plate 119 are formed at small pitches on the remaining prism sheet 124. Light irradiated from the exit surface of the light-guide plate 119 and diffused by the diffusion layer 122 is refracted by the pair of prism sheets 123 and 124 in a direction to decrease an angle with respect to the direction of normal to the exit surface of the light-guide plate 119, and is irradiated as illumination light having intensity distribution that exhibits high exit light intensity in the direction of normal, i.e., in the direction to the front.

The frame member 118 of the surface light source unit 117 is a molded product made of a synthetic resin, and comprises a rectangular frame-like bottom frame 118a corresponding to the peripheral edge portion of that surface of the liquid crystal display panel 110 which is on a side opposite to the observation side, and a circumferential, wall 118b formed on the outer peripheral portion of the bottom frame 118a.

A reflecting plate 125 is arranged on that surface of the frame member 118 which is on a side opposite to the side where the liquid crystal display panel 110 is arranged. The reflecting plate 125 is fixed to the outer surface of the bottom frame 1ea so that its outer peripheral portion is integral with the outer surface of the bottom frame 18a. The reflecting plate 125 serves to reflect light leaking from the reflection surface of the light-guide plate 119 of the surface light source 117a so that the reflected light enters the reflection surface of the light-guide plate 119 again.

The surface light source 117a is arranged in that space of the frame member 118 which is surrounded by the bottom frame 118a. The reflection surface of the light-guide plate 119 is adhered to the reflecting plate 125 through a transparent adhesive material or pressure-sensitive adhesive double coated film.

The liquid crystal display panel 110 is arranged in that space of the surface light source 117a which is surrounded by the circumferential wall 118b of the frame member 118. The peripheral edge portion of that surface (the outer surface of the opposite side polarizing plate 107) of the liquid crystal display panel 110 which is on a side opposite to the observation side is supported by the bottom frame 118a of the frame member 118, and adhered and fixed to the bottom frame 118a of the frame member 118 through a pressure-sensitive adhesive double coated tape 126.

The protection plate 109 on the observation side of the liquid crystal display panel 110 is formed of a transparent plate such as a glass plate or acrylic resin plate, and has a rectangular plate-like shape that is almost the same as the planar shape (the shape as viewed from the observation side) of the liquid crystal display panel 110.

A light-shielding film 127 is formed on the outer peripheral portion of that surface of the protection plate 109 which opposes the liquid crystal display panel 110 to correspond to that region of the liquid crystal display panel 110 which is outside the screen area. The light-shielding film 127 is formed of a light-shielding paint printed film or a metal film such as a chromium plating or deposition film.

The spacer 211 arranged between the liquid crystal display panel 110 and protection plate 109 to surround the region that corresponds to the screen area of the liquid crystal display panel 110 is formed of a resin film. The spacer 211 is adhered to one of the opposing surfaces of the liquid crystal display panel 110 and protection plate 109, that is, on that surface (the outer surface of the observation side polarizing plate 106) of the liquid crystal display panel 110 which opposes the protection plate 109, through a pressure-sensitive adhesive double coated tape 113, and is abutted against the remaining one of the opposing surfaces, i.e., that surface of the protection plate 109 which opposes the liquid crystal display panel 120.

The filler layer 114 filling the region that is surrounded by the spacer 211 of the gap between the liquid crystal display panel 110 and protection plate 109 is formed of a resin similar to that of the first embodiment and having the characteristics of both ultraviolet polymerization properties and thermal polymerization properties, in accordance with a method similar to the manufacturing method described in the first embodiment.

More specifically, the spacer 211 is adhered to the observation side surface of the liquid crystal display panel 110 through the pressure-sensitive adhesive double coated tape 113. After that, a transparent resin having the characteristics of both ultraviolet polymerization properties and thermal polymerization properties is supplied by a dispenser or the like to near the center (near the center of the screen area) of that surface of the liquid crystal display panel 110 which is adhered with the spacer 211. The protection plate 109 is overlaid on the transparent resin and pressurized. Hence, that surface of the protection plate 109 which opposes the liquid crystal display panel 110 is abutted against the spacer 211. The abutting pressure spreads the transparent resin in the entire region surrounded by the spacer 211. Ultraviolet rays are irradiated to the outer surface side of the protection plate 109 for a predetermined period of time while maintaining the pressurized state. After that, the pressure is removed, and the resultant structure is left still in a heating atmosphere maintained at the polymerization temperature of the transparent resin for a predetermined period of time. As a result, the resultant structure is integrated.

The spacer 211 includes at least one missing portion, preferably a plurality of missing portions, to connect the inside and outside of the region to each other. When the protection plate 109 is overlaid on the transparent resin supplied onto the liquid crystal display panel 110 and is pressurized, the transparent resin is spread while discharging air between the liquid crystal display panel 110 and protection plate 109 to the outside through the missing portions formed in the spacer 211, to fill the entire region surrounded by the spacer 211.

In the region surrounded by the spacer 211, the liquid crystal display panel 110 and protection plate 109 are bonded to each other through the layer of the transparent resin.

In the liquid crystal display module 129, the liquid crystal display panel 110 and surface light source unit 117 are integrated by adhering and fixing them to the bottom frame 118a of the frame member 118 of the surface light source unit 117, at the peripheral edge portions on a side opposite to the observation side of the liquid crystal display panel 110, through the pressure-sensitive adhesive double coated tape 126. The liquid crystal display panel 110 and protection plate 109 are integrated by bonding them through the filler layer 114 filling the region that is surrounded by the spacer 211 of the gap between the liquid crystal display panel 110 and protection plate 109. Accordingly, the liquid crystal display module 129 can be assembled easily.

As shown in FIG. 14, the liquid crystal display module 129 is arranged in the housing 120 by fitting the protection plate 109 in the opening 121 of the housing 120 and fixing the surface light source unit 117 to a module support 130 provided in the housing 120.

According to this embodiment, the module support 130 in the housing 120 is provided with positioning projections 140 that abut against the outer circumferential surface of the frame member 118 of the surface light source unit 117. The frame member 118 of the surface light source unit 117 is fixed to the positioning projections 140 by a means such as fixing with machine screws.

The space between the circumferential wall 118b of the frame member 118 of the surface light source unit 117 and the peripheral edge portion of the opening 121 of the housing 120 is provided with a seal frame 141 to prevent dust from entering the housing 120 through the gap between the peripheral surface of the opening 121 and the outer circumferential surface of the protection plate 109. The seal frame 141 is made of an elastic material such as sponge. One surface of the seal frame 141 is adhered to one of the inner surface of the housing 120 and the top surface of the circumferential wall 118b of the frame member 118 that oppose each other. The other surface of the seal frame 141 is brought into contact with the remaining one of the two opposing surfaces. Hence, the seal frame 141 is sandwiched between the opposing surfaces in a state compressed to a certain degree.

In this liquid crystal display apparatus, the liquid crystal display module 129 is the integral body of the liquid crystal display panel 110, the surface light source unit 117 having the surface light source 117a, and the protection plate 109. The protection plate 109 is fitted in the opening 121 of the housing 120, and the surface light source unit 117 is fixed to the module support 130 provided in the housing 120. Accordingly, when arranging the liquid crystal display module 129 in the housing 120 having the opening 121, the liquid crystal display panel 110, surface light source 117a, and protection plate 109 can be arranged in the housing 120 at once.

In addition, the liquid crystal display panel 110 is fixed to the surface light source unit 117. The spacer 211 is arranged between the liquid crystal display panel 110 and protection plate 109 so as to surround the region that corresponds to the screen area of the liquid crystal display panel 110. The elastic filler layer 114 is filling the region that is surrounded by the spacer 211 of the gap between the liquid crystal display panel 110 and protection plate 109. In this manner, in the liquid crystal display module 129, the liquid crystal display panel 110 and protection plate 109 are integrated. Accordingly, the liquid crystal display module 129 can be assembled easily, thereby decreasing the manufacturing cost of the liquid crystal display apparatus.

Furthermore, in this liquid crystal display apparatus, the surface light source unit 117 of the liquid crystal display module 129 comprises the surface light source 117a to emit illumination light toward the liquid crystal display panel 110, and the frame member 118 supporting the surface light source 117a. Of the liquid crystal display panel 110, the frame member 118 of the surface light source unit 117, and the protection plate 109, the frame member 118 that has the highest strength is fixed to the module support 130 in the housing 120. Accordingly, the attaching strength of the liquid crystal display module 129 with respect to the housing 120 can be ensured sufficiently.

Ninth Embodiment

Figure 16:
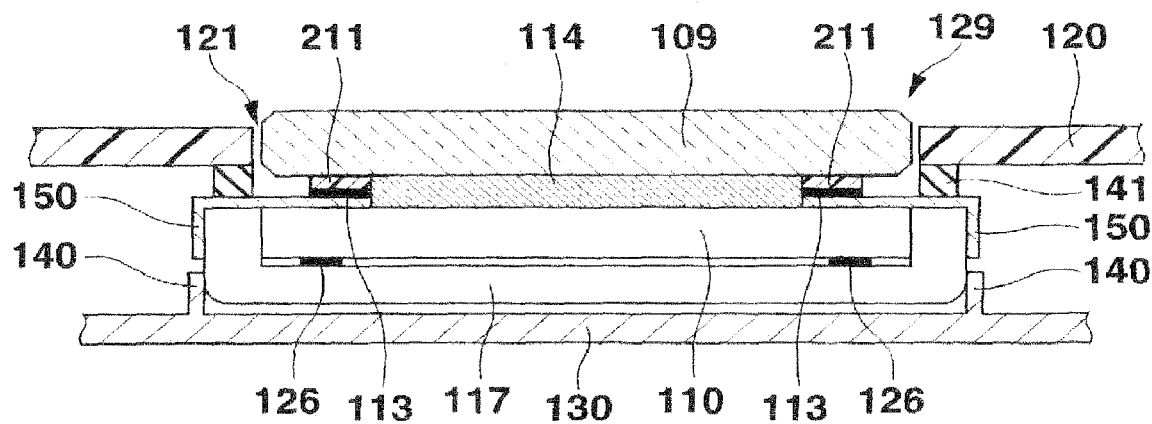
FIG. 16 is a schematic sectional view of a liquid crystal display apparatus according to the ninth embodiment of the present invention.

FIG. 16 is a schematic sectional view of a liquid crystal display apparatus according to the ninth embodiment of the present invention. In the ninth embodiment, portions that are identical to their equivalents in the eighth embodiment described above are denoted by the same reference numerals, and a repetitive description will be omitted.

In the liquid crystal display apparatus of this embodiment, a liquid crystal display module 129 is adhered and fixed to a bottom frame 118a of a frame member 118 (see FIG. 15) of a surface light, source unit 117, at a peripheral edge portion of its surface on a side opposite to the observation side of a liquid crystal display panel 110, through a pressure-sensitive adhesive double coated tape 126. The peripheral edge portion of the observation side surface of the liquid crystal display panel 110 is urged and fixed to the bottom frame 118e of the frame member 118 by a retaining member 150 that is attached to a circumferential wall 118h of the frame member 118 and abutted against the peripheral edge portion of the observation side surface of the liquid crystal display panel 110. Except for this, the arrangement of the ninth embodiment is the same as that of the first embodiment.

For example, the retaining member 150 comprises a metal frame having a display panel retaining portion and a frame-like attaching portion. The display panel retaining portion abuts against the peripheral edge portion of the observation side surface of the liquid crystal display panel 110. The frame-like member attaching portion is fitted on the outer circumferential surface of the circumferential wall 118b of the frame member 118. The frame-like member attaching portion is attached to the outer circumferential surface of the circumferential wall 118b of the frame member 118 by a means such as fixing with machine screws.

When employing such a retaining member 150, a light-shielding film such as a plated chromium film may be formed on the outer surface of the display panel retaining portion of the retaining member 150. The light-shielding film 127 formed on the protection plate 109 in the first embodiment may be omitted.

In the ninth embodiment, the liquid crystal display panel 110 of the liquid crystal display modal 129 may be fixed to the frame member 118 of the surface light source unit 117 by only the retaining member 150.

In the eighth and ninth embodiments, as the spacer 211 that is provided between the liquid crystal display panel 110 and protection plate 109 of the liquid crystal display module 129 to surround the region that corresponds to the screen area of the liquid crystal display panel 110, one formed of a resin film is used. The spacer 211 is adhered to one of the opposing surfaces of the liquid crystal display panel 110 and protection plate 109 and abutted against the remaining one of the opposing surfaces. The spacer 211 may be formed of a pressure-sensitive adhesive double coated film. Also, any of the spacers employed in the first to seventh embodiments described above may be employed.

In the respective embodiments described above, assume a case in which a glass plate other than a tempered glass plate, or a transparent plate, e.g., an acrylic resin plate, which is free from fragment scattering caused by fracture is provided as the observation surface protection plate. In this case, as a light-shielding flirt corresponding to that region of the liquid crystal display panel 1 which is outside the screen area 1a, a light-shielding resin film formed into the same shape as that of the splinterproof sheet 15 of the seventh embodiment may be adhered to that surface of the protection plate which opposes the liquid crystal display panel 1.

The display device integral with the protection plate according to each of the first to ninth embodiments described above comprises a liquid cry display device panel as a display device that displays an image. The display device is not limited to a liquid crystal display panel, but may be an electroluminescence display panel, plasma display panel, or the like.

As described above, a display device according to the present invention is characterized by comprising a display panel to display an image, a protection plate that is arranged on an observation side of the display panel with a predetermined gap with respect to the display panel and configured to protect an observation surface of the display panel, a spacer that is arranged between the display panel and the protection plate to surround a region that corresponds to a screen area of the display panel, the spacer at least partly including at least one missing portion to connect an inside and an outside of the region to each ether, and a filler layer filling the region that is surrounded by the spacer of a gap between the display panel and the protection plate, the filler layer having been polymerized by irradiation of light and heating.

In the display device, preferably, the filler layer is formed of a resin having characteristics of both ultraviolet polymerization properties and thermal polymerization properties. Preferably, the spacer forms a rectangular frame surrounding the region that corresponds to the screen area of the display panel, and includes missing portions formed near each of four corners of the spacer in this case, desirably, each missing portion of the spacer is formed in such a shape that a width of the missing portions increases from an outer edge toward an inner edge of the spacer.

In the display device, preferably, the spacer forms a rectangular frame surrounding the region that corresponds to the screen area of the display panel, and includes missing portions formed at four sides and four corners of the spacer. Preferably, the spacer is formed of a resin film, adhered to one of opposing surfaces of the display panel and the protection plate through a pressure-sensitive adhesive double coated film, and abutted against the remaining one of the opposing surfaces. In addition, preferably, the spacer is formed of a pressure-sensitive adhesive double coated film and adhered to each of opposing surfaces of the display panel and the protection plate. Preferably, the display device further comprises a splinterproof sheet against fracture of the protection plate. The splinterproof sheet is adhered to an entire outer peripheral portion of a our ace of the protection plate that opposes the display panel, between an outer circumferential edge of a portion corresponding to the spacer and a circumferential edge of the protection plate. In this case, desirably, the splinterproof sheet is formed integrally with the spacer. Desirably, a portion of a spacer side edge portion of the splinterproof sheet that corresponds to the missing portion of the spacer is located outside an outer circumferential edge of a region of the display panel that corresponds to the filler layer. Desirably, the display device further comprises a light-shielding film formed on the outer peripheral portion of the surface of the protection plate that opposes the display panel, the light-shielding film corresponding to a region that is outside the screen area of the display panel. Furthermore, desirably, the splinterproof sheet includes light-shielding properties and forms a light-shielding film that corresponds to an outer side of the screen area of the display panel.

A display device according to the present invention is characterized by comprising a display panel to display an image, a protection plate that is arranged on an observation side of the display panel with a predetermined gap with respect to the display panel and configured to protect, an observation surface of the display panel, a film member that is arranged on a surface of the protection plate that opposes the display panel outside a screen area of the display panel so as to surround a region that corresponds to the screen area and overlap the display panel at least partly, the film member including at least one missing portion formed at portion overlapping with the display panel, the missing portion extending outside the display panel to connect an inside and an outside of the region to each other, and a filler layer formed of a resin which is filling the region that is surrounded by an inner edge of the film member of a gap between the display panel and the protection plate.

In the display device, preferably, the film member comprises a colored resin film. Preferably, the film member is adhered to the protection plate through a pressure-sensitive adhesive material.

Furthermore, a display apparatus according to the present invention is characterized by comprising a housing including a display opening, a support provided in the housing to correspond to the opening, a display device including a display panel to display an image, protection plate that is arranged on an observation side of the display panel with a predetermined gap with respect to the display panel, has a size to fit in the opening of the housing, and is configured to protect an observation surface of the display panel, a spacer that is arranged between the display panel and the protection plate to surround a region that corresponds to a screen area of the display panel, and includes at least one missing portion to connect an inside and an outside of the region to each other, and an elastic filler layer filling the region that is surrounded by the spacer of a gap between the display panel and the protection plate, having elasticity, and having been polymerized by irradiation of light, and heating, and a surface light source unit that is fixed to the support in the housing on a side of the display device that is opposite to the observation side, and configured to fix the display device and radiate illumination light toward the display device.

In the display apparatus, preferably, the surface light source unit comprises a surface light source to emit the illumination light toward the display device, and a frame-like member supporting the surface light source, the frame-like member being fixed to the support in the housing. In this case, desirably, the frame-like member of the surface light source unit comprises a bottom frame that supports a peripheral edge portion of a surface of the display device that is on a side opposite to the observation side, and a circumferential wall that is formed on an outer circumferential portion of the bottom frame so as to provide a space to store the display device. Desirably, the display apparatus further comprises a retaining member that is attached to the circumferential wall of the frame-like member of the surface light surface unit and serves to abut against a peripheral edge portion of an observation side surface of the display device to urge the display device against the bottom frame of the frame-like member, thereby fixing the display device. In the display apparatus, preferably, the filler layer filling the region that is surrounded by the spacer of the gap between the display device and the observation surface protection plate is formed of a resin having characteristics of both ultraviolet polymerization properties and thermal polymerization properties.

Additional advantages and modifications will readily occur to these skilled in the art. Therefore, the invention in its broader aspects is not limited to the specific details and representative embodiments shown and described herein.

Accordingly, various modifications may be made without departing from the spirit or scope of the general inventive concept as defined by the appended claims and their equivalents.

What is claimed is:

1. A method of manufacturing a display device, comprising:
   arranging a spacer formed into a frame and which includes at least one missing portion on one side of a display panel to display an image so that the frame surrounds a region corresponding to a screen area of the display panel;
   supplying a filler to the region surrounded by the spacer on the one side of the display panel, the filler having both a characteristic of being polymerized by ultraviolet radiation and a characteristic of being polymerized by heating;
   overlapping a protection plate on the display panel so that the spacer and the filler are sandwiched between the display panel and the protection plate, and pressurizing the protection plate to spread the filler supplied on the one side of the display panel and to discharge air within the region surrounded by the spacer from the missing portion; and
   polymerizing the filler by the ultraviolet radiation in a pressurized state, and thereafter, polymerizing the filler by the heating in a state in which the pressurized state is canceled.

2. The method according to claim 1, wherein the spacer forms a rectangular frame, the missing portion is formed in a region corresponding to a corner of the rectangular frame, and a width of the missing portion increases from an outer edge toward an inner edge of the spacer.

3. The method according to claim 1, wherein the filler comprises a transparent resin in which a hardening initiator made of an organic peroxide is added to a cycloaliphatic epoxy resin.

4. The method according to claim 1, wherein a viscosity of the filler is set to be not less than 3,000 mPas and not greater than 5,000 mPas.

5. The method according to claim 1, wherein the spacer is adhered to the protection plate as a splinterproof sheet against fracture of the protection plate.

6. A method of manufacturing a display device, comprising:
   arranging a spacer formed into a frame and which includes at least one missing portion on one side of a display panel to display an image so that the frame surrounds a region corresponding to a screen area of the display panel;
   supplying a filler to the region surrounded by the spacer on the one side of the display panel, the filler having both a characteristic of being polymerized by ultraviolet radiation and a characteristic of being polymerized by heating;
   overlapping a protection plate on the display panel so that the spacer and the filler are sandwiched between the display panel and the protection plate, and pressurizing the protection plate to spread the filler supplied on the one side of the display panel and to discharge a surplus filler within the region surrounded by the spacer from the missing portion; and
   polymerizing the filler by the ultraviolet radiation in a pressurized state, and thereafter, polymerizing the filler by the heating in a state in which the pressurized state is canceled,
   wherein the spacer forms a rectangular frame, the missing portion is formed in a region corresponding to a corner of the rectangular frame, and a width of the missing portion increases from an outer edge toward an inner edge of the spacer.

7. A method of manufacturing a display device, comprising:
   arranging a spacer formed into a frame and which includes at least one missing portion on one side of a display panel to display an image so that the frame surrounds a region corresponding to a screen area of the display panel;
   supplying a filler to the region surrounded by the spacer on the one side of the display panel, the filler having both a characteristic of being polymerized by ultraviolet radiation and a characteristic of being polymerized by heating;
   overlapping a protection plate on the display panel so that the spacer and the filler are sandwiched between the display panel and the protection plate, and pressurizing the protection plate to spread the filler supplied on the one side of the display panel and to discharge a surplus filler within the region surrounded by the spacer from the missing portion; and
   polymerizing the filler by the ultraviolet radiation in a pressurized state, and thereafter, polymerizing the filler by the heating in a state in which the pressurized state is canceled,
   wherein a viscosity of the filler is set to be not less than 3,000 mPas and not greater than 5,000 mPas.

8. A method of manufacturing a display device, comprising:
   arranging a spacer formed into a frame and which includes at least one missing portion on one side of a display panel to display an image so that the frame surrounds a region corresponding to a screen area of the display panel;
   supplying a filler to the region surrounded by the spacer on the one side of the display panel, the filler having both a characteristic of being polymerized by ultraviolet radiation and a characteristic of being polymerized by heating;
   overlapping a protection plate on the display panel so that the spacer and the filler are sandwiched between the display panel and the protection plate, and pressurizing the protection plate to spread the filler supplied on the one side of the display panel and to discharge a surplus filler within the region surrounded by the spacer from the missing portion; and
   polymerizing the filler by the ultraviolet radiation in a pressurized state, and thereafter, polymerizing the filler by the heating in a state in which the pressurized state is canceled,
   wherein the spacer is adhered to the protection plate as a splinterproof sheet against fracture of the protection plate.

* * * * *